(12) United States Patent
Kim et al.

(10) Patent No.: US 7,508,333 B2
(45) Date of Patent: Mar. 24, 2009

(54) METHOD AND APPARATUS TO QUANTIZE AND DEQUANTIZE INPUT SIGNAL, AND METHOD AND APPARATUS TO ENCODE AND DECODE INPUT SIGNAL

(75) Inventors: Junghoe Kim, Seoul (KR); Eunmi Oh, Seongnam-si (KR); Anton Porov, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 11/581,331

(22) Filed: Oct. 17, 2006

(65) Prior Publication Data

US 2007/0229345 A1    Oct. 4, 2007

(30) Foreign Application Priority Data

Apr. 3, 2006    (KR) ............... 10-2006-0030167

(51) Int. Cl.
*H03M 7/26* (2006.01)
(52) U.S. Cl. .................... 341/200; 341/143
(58) Field of Classification Search ........... 341/106, 341/143, 200; 375/240.16; 704/229; 382/243
See application file for complete search history.

(56) References Cited

U.S. PATENT DOCUMENTS

| 5,712,686 | A | | 1/1998 | Cho | |
|---|---|---|---|---|---|
| 6,144,698 | A | * | 11/2000 | Poon et al. | 375/240.16 |
| 6,871,106 | B1 | | 3/2005 | Ishikawa et al. | |
| 2003/0088423 | A1 | * | 5/2003 | Nishio et al. | 704/500 |
| 2003/0202582 | A1 | * | 10/2003 | Satoh | 375/240.03 |
| 2004/0181395 | A1 | * | 9/2004 | Kim et al. | 704/200.1 |
| 2005/0075871 | A1 | * | 4/2005 | Youn | 704/229 |
| 2005/0265618 | A1 | * | 12/2005 | Jebara | 382/243 |
| 2005/0270195 | A1 | * | 12/2005 | Kim et al. | 341/106 |

FOREIGN PATENT DOCUMENTS

| JP | 6-224862 | 8/1994 |
|---|---|---|
| KR | 2002-8429 | 1/2002 |

OTHER PUBLICATIONS

PCT Search Report dated Jan. 26, 2007 issued in KR 2006-4268.

* cited by examiner

*Primary Examiner*—Jean B Jeanglaude
(74) *Attorney, Agent, or Firm*—Stanzione & Kim, LLP

(57) ABSTRACT

A method and apparatus to quantize and dequantize an input signal, and a method and apparatus to encode and decode an input signal. The method of quantizing an input signal includes determining a quantization scale type according to a distribution feature of the input signal, and quantizing the input signal according to the determined quantization scale type. Accordingly, when a number of assigned bits is small in an encoding process, signal distortion can be minimized without an increase in complexity or having to use large sized additional information in order to determine an optimum scale. In addition, the input signal can be encoded by considering a trade-off of a distortion rate corresponding to the number of assigned bits of the input signal.

48 Claims, 12 Drawing Sheets

METHOD AND APPARATUS TO QUANTIZE AND DEQUANTIZE INPUT SIGNAL, AND METHOD AND APPARATUS TO ENCODE AND DECODE INPUT SIGNAL

CROSS-REFERENCE TO RELATED APPLICATIONS

This application claims priority under 35 U.S.C. §119(a) of Korean Patent Application No. 10-2006-0030167, filed on Apr. 3, 2006, in the Korean Intellectual Property Office, the disclosure of which is incorporated herein in its entirety by reference.

BACKGROUND OF THE INVENTION

1. Field of the Invention

The present general inventive concept relates to an apparatus and method of encoding and decoding an input signal, and more particularly, to a method and apparatus to quantize and dequantize an input signal to obtain better compression efficiency, and a method and apparatus to encode and decode an input signal.

2. Description of the Related Art

An input signal containing information is originally an analog signal having a continuous waveform in terms of amplitude and time. Thus, in order for the waveform to be expressed as a discrete signal, analog-to-digital (A/D) conversion is required. The A/D conversion includes two processes. First, a sampling process is used to convert a time-continuous signal into a discrete signal, and secondly, an amplitude quantizing process is used to limit the number of feasible amplitudes to a finite number. In the amplitude quantizing process, an input amplitude x(n) is converted into an element y(n) included in a finite set of feasible amplitudes at time n.

With the recent development of digital signal processing techniques, a digital audio signal storing/restoring method is widely used by ordinary users, in which a conventional analog signal is sampled and quantized, converted into pulse code modulation (PCM) data, that is, a digital signal, and is stored in a recording/storing medium such as a compact disc (CD) or a digital audio tape (DAT), so that a user can reproduce the stored signal if necessary. According to the digital audio storing/restoring method, audio quality has been improved, and deterioration of audio quality due to storage time has been overcome in comparison with an analog type method such as a long-play record (LP) or tape. However, due to a large size of digital data, there has been a problem in signal storing and transfer processes.

In order to solve this problem, a differential pulse code modulation (DPCM) method, an adaptive differential pulse code modulation (ADPCM) method, and so on, have been developed in order to compress a digital audio signal. By using these methods, although an effort has been made to obtain a digital audio signal having a small data size, there is a problem in that efficiency greatly depends on signal types. A Moving Pictures Expert Group (MPEG)/audio scheme recently standardized by the International Standard Organization (ISO) or an Audio Codec (AC-2/AC-3) scheme developed by Dolby use psychoacoustic modeling to reduce a data size. These methods have significantly reduced the data size in an effective manner regardless of signal characteristics.

In the conventional audio signal compression technique, such as MPEG-1/audio, MPEG-2/audio, or AC-2/AC-3, a time-domain signal is bound to a block having a specific size, and is transformed into a frequency-domain signal. Thereafter, the transformed signal is scalar-quantized by using the psychoacoustic modeling. The quantization scheme is simple, but is not an optimum scheme, even if an input sample is statistically independent. If the input sample is statistically dependent, the quantization scheme is far less sufficient. To avoid this problem, lossless-encoding, such as entropy encoding, is performed. Alternatively, encoding is performed along with a certain type of adaptive quantization. Accordingly, an encoding process has become significantly complex in comparison with a method in which only simple PCM data is stored. Furthermore, a bit stream includes not only quantized PCM data but also additional information for compressing a signal.

The MPEG/audio standard or the AC-2/AC-3 technique provides audio quality which is almost the same as that of a compact disc (CD) at a bit rate ranging from 64 Kbps to 384 Kbps, which is ⅙ to ⅛ smaller than that of conventional digital encoding. Thus, the MPEG/audio standard is expected to play an important role in storing and transferring an audio signal of various systems, such as digital audio broadcasting (DAB), internet phones, audio on demand (AOD), and multimedia systems.

In an MPEG-1/2 audio encoding technique, sub-band filtering is performed, and a sub-band sample is then linear-quantized by using bit assignment information proposed by the psychoacoustic modeling. Thereafter, the sub-band sample is subjected to a bit packing process, thereby completing encoding. In the quantizing process, a linear quantizer has optimum capability when a data distribution is uniform. However, the linear quantizer causes severe signal distortion when a number of assigned bits is small.

An actual data distribution is not uniform but is similar to a Gaussian or Laplacian distribution. In this case, a quantizer may be designed to fit a corresponding distribution, so as to obtain an optimum result in terms of mean squared error (MSE). A general audio encoder such as advanced audio coding (AAC) of MPEG-2/4 uses a nonlinear quantizer. This is designed by taking a sample distribution of a modified discrete cosine transform (MDCT) and a psychoacoustic aspect into account. However, since one quantizer is used for a variety of input signals, there are disadvantages in that encoding cannot be effectively achieved in terms of a bit rate, and audio quality may deteriorate. Furthermore, there is an increase in complexity in order to obtain high audio quality.

SUMMARY OF THE INVENTION

The present general inventive concept provides a method and apparatus to quantize and dequantize an input signal, which provides an optimum quantization method to quantize an input signal according to a bit rate and a distortion rate.

The present general inventive concept also provides a method and apparatus to encode and decode an input signal, which provides an optimum quantization method for the input signal according to a bit rate and a distortion rate.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a method of quantizing an input signal, the method including determining a quantization scale type indicating a scale type for quantization according to a distribution feature of the input signal, and quantizing the input signal according to the determined quantization scale type and the distribution feature.

The determining of the quantization scale type may include determining a generalized Gaussian distribution variable at which a generalized Gaussian distribution matches a distribution of an input signal, determining correlation between a number of assigned bits used to encode the input signal and a distortion rate of the input signal by using the determined generalized Gaussian distribution variable, and determining a quantization scale type corresponding to the distortion rate of the input signal and a scale factor for quantization from the determined correlation.

The foregoing and/or other aspects of the present general inventive concept may also be achieved by providing a computer-readable medium having embodied thereon a computer program to execute a method of quantizing an input signal, the method including determining a quantization scale type indicating a scale type for quantization according to a distribution feature of the input signal, and quantizing the input signal according to the determined quantization scale type and the distribution feature.

The foregoing and/or other aspects of the present general inventive concept may also be achieved by providing a method of encoding an input signal, the method including determining a quantization scale type indicating a scale type for quantization according to a distribution feature of the input signal, quantizing the input signal according to the determined quantization scale type and the distribution feature, and encoding the quantized input signal.

The foregoing and/or other aspects of the present general inventive concept may also be achieved by providing a method of dequantizing an input signal, the method including dequantizing the input signal according to a quantization scale type corresponding to a distortion rate of the input signal and a scale factor for quantization.

The foregoing and/or other aspects of the present general inventive concept may also be achieved by providing a computer-readable medium having embodied thereon a computer program to execute a method of dequantizing an input signal, including dequantizing the input signal according to a quantization scale type corresponding to a distortion rate of the input signal and according to a scale factor used for quantization.

The foregoing and/or other aspects of the present general inventive concept may also be achieved by providing a method of decoding an input signal, the method including decoding the input signal, and dequantizing the decoded input signal according to a quantization scale type corresponding to a distortion rate of the decoded input signal and a scale factor for quantization.

The foregoing and/or other aspects of the present general inventive concept may also be achieved by providing an apparatus to quantize an input signal, including a type determination unit to determine a quantization scale type indicating a scale type for quantization according to a distribution feature of the input signal, and a quantizer to quantize the input signal according to the determined quantization scale type and the distribution feature.

The type determination unit may include a variable determination unit to determine a generalized Gaussian distribution variable at which a generalized Gaussian distribution matches a distribution of the input signal, a correlation determination unit to determine a correlation between a number of assigned bits used to encode the input signal and a distortion rate of the input signal by using the determined generalized Gaussian distribution variable, and a scale type and factor determination unit to determine a quantization scale type corresponding to the distortion rate of the input signal and a scale factor for quantization from the determined correlation.

The foregoing and/or other aspects of the present general inventive concept may also be achieved by providing an apparatus to encode an input signal, including a type determination unit to determine a quantization scale type indicating a scale type for quantization according to a distribution feature of the input signal, a quantizer to quantize the input signal according to the determined quantization scale type and the distribution feature, and an encoder to encode the quantized input signal.

The foregoing and/or other aspects of the present general inventive concept may also be achieved by providing an apparatus to dequantize an input signal, including a dequantizer to dequantize the input signal according to a quantization scale type corresponding to a distortion rate of the input signal and a scale factor for quantization.

The foregoing and/or other aspects of the present general inventive concept may also be achieved by providing an apparatus to decode an input signal, including a decoder to decode the input signal, and a dequantizer to dequantize the decoded input signal according to a quantization scale type corresponding to a distortion rate of the decoded input signal and a scale factor for quantization.

The foregoing and/or other aspects of the present general inventive concept may also be achieved by providing a method of encoding an input signal, the method including encoding an input signal according to a quantization scale type and a scale factor corresponding to a distribution feature of the input signal, and generating the encoded signal information on the quantization scale type and the scale factor corresponding to the distribution feature.

The foregoing and/or other aspects of the present general inventive concept may also be achieved by providing an apparatus to encode an input signal, including an encoder to encode an input signal according to a quantization scale type and a scale factor corresponding to a distribution feature of the input signal, and to generate the encoded signal and information on the quantization scale type and the scale factor corresponding to the distribution feature.

The foregoing and/or other aspects of the present general inventive concept may also be achieved by providing a method of decoding an input signal, the method including decoding an input signal indicating according to a quantization scale type according to a distribution feature of the input signal, and a processor to process the input signal according to the determined quantization scale type and the distribution feature.

The foregoing and/or other aspects of the present general inventive concept may also be achieved by providing an apparatus to decode an input signal, including a decoder to decode an input signal to extract a quantization scale type and a scale factor, and to quantize the decoded signal according to the extracted quantization scale type and the scale factor.

The foregoing and/or other aspects of the present general inventive concept may also be achieved by providing a method of processing an input signal, the method including determining a quantization scale type according to a distribution feature of the input signal, the distribution feature of the input signal comprising a generalized Gaussian distribution variable which represents a correlation between a number of assigned bits and a distortion rate of the input signal, and processing the input signal according to the determined quantization scale type and the distribution feature.

The foregoing and/or other aspects of the present general inventive concept may also be achieved by providing an apparatus to process an input signal, including a scale type determination unit to determine a quantization scale type according to a distribution feature of the input signal, the distribution feature of the input signal comprising a generalized Gaussian distribution variable which represents a correlation between a number of assigned bits and a distortion rate of the input signal, and a processor to process the input signal according to the determined quantization scale type and the distribution feature.

The foregoing and/or other aspects of the present general inventive concept may also be achieved by providing an apparatus to encode and decode an input signal including an encoder to encode an input signal according to a quantization scale type and a scale factor corresponding to a distribution feature of the input signal, and to generate the encoded signal and information on the quantization scale type and the scale factor corresponding to the distribution feature, and a decoder to decode the encoded input signal to extract the quantization scale type and the scale factor, and to quantize the decoded signal according to the extracted quantization scale type and the scale factor.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
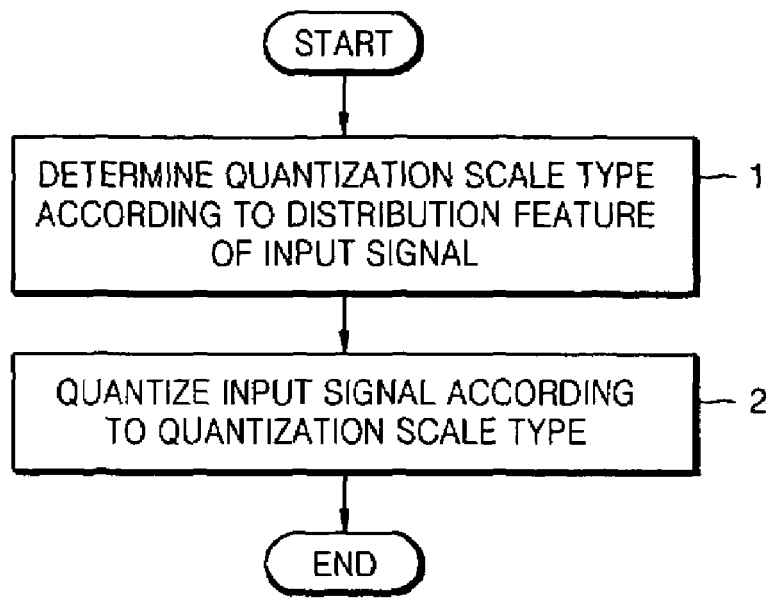
FIG. 1 is a flowchart illustrating a method of quantizing an input signal according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. Now, a method of quantizing an input signal according to an embodiment of the present general inventive concept will be described in detail with reference to the accompanying drawings.

FIG. 1 is a flowchart illustrating a method of quantizing an input signal according to an embodiment of the present general inventive concept.

According to a distribution feature of the input signal, a quantization scale type indicating a scale type for quantization is determined (operation 1).

Figure 2:
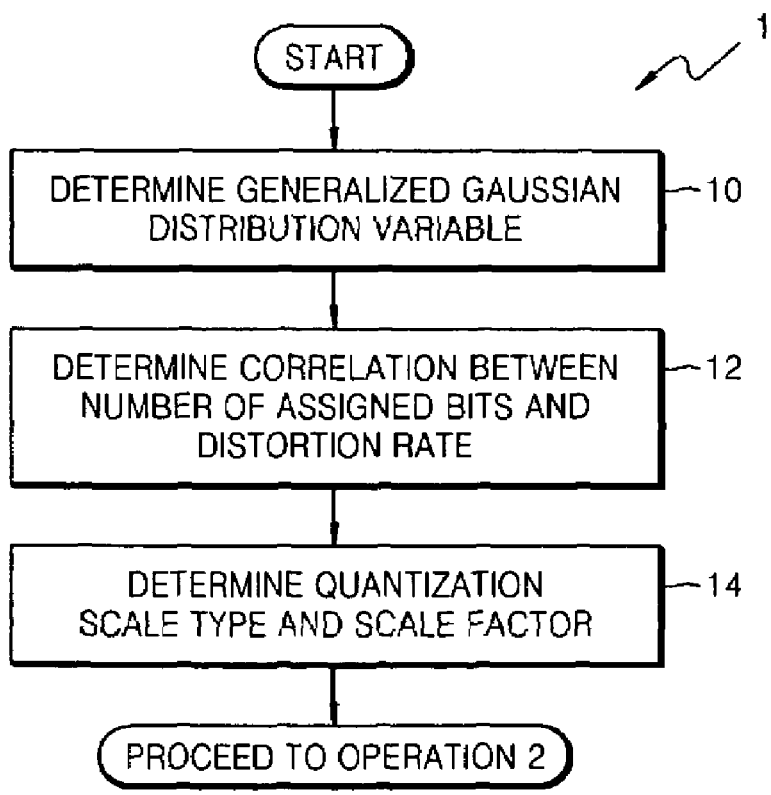
FIG. 2 is a flowchart illustrating an operation of determining a quantization scale type in the method of FIG. 1.

FIG. 2 is a flowchart illustrating operation 1 of the method of FIG. 1.

A generalized Gaussian distribution variable, at which a generalized Gaussian distribution matches an input signal distribution, is determined (operation 10). In particular, an audio signal is input as an input signal. The generalized Gaussian distribution is defined as a distribution set, a parameter of which is determined by a Gaussian exponent α of a probability distribution. The Gaussian exponent α regulates kurtosis (i.e., degree of peakedness) of distribution. The generalized Gaussian distribution f(x|α) is expressed as follows below in Formula 1.

$$f(x|\alpha) = \left[\frac{\alpha\eta(\alpha,\beta)}{2\Gamma(1/\alpha)}\right]\exp\{-[\eta(\alpha,\beta)|x|]^{\alpha}\},$$

$$\eta(\alpha,\beta) = \beta^{-1}\left[\frac{\Gamma(3/\alpha)}{\Gamma(1/\alpha)}\right]^{1/2}$$

Formula 1

Here, Γ is a gamma function, α is the Gaussian exponent of the probability distribution, x is an input signal, and η(α,β) is a function of α and β.

If the Gaussian exponent α is 1, the generalized Gaussian distribution becomes a standard Laplacian distribution, and if the Gaussian exponent α is 2, the generalized Gaussian distribution becomes a normal distribution.

Hereinafter, the aforementioned Gaussian exponent α is referred to as the generalized Gaussian distribution variable.

Figure 3:
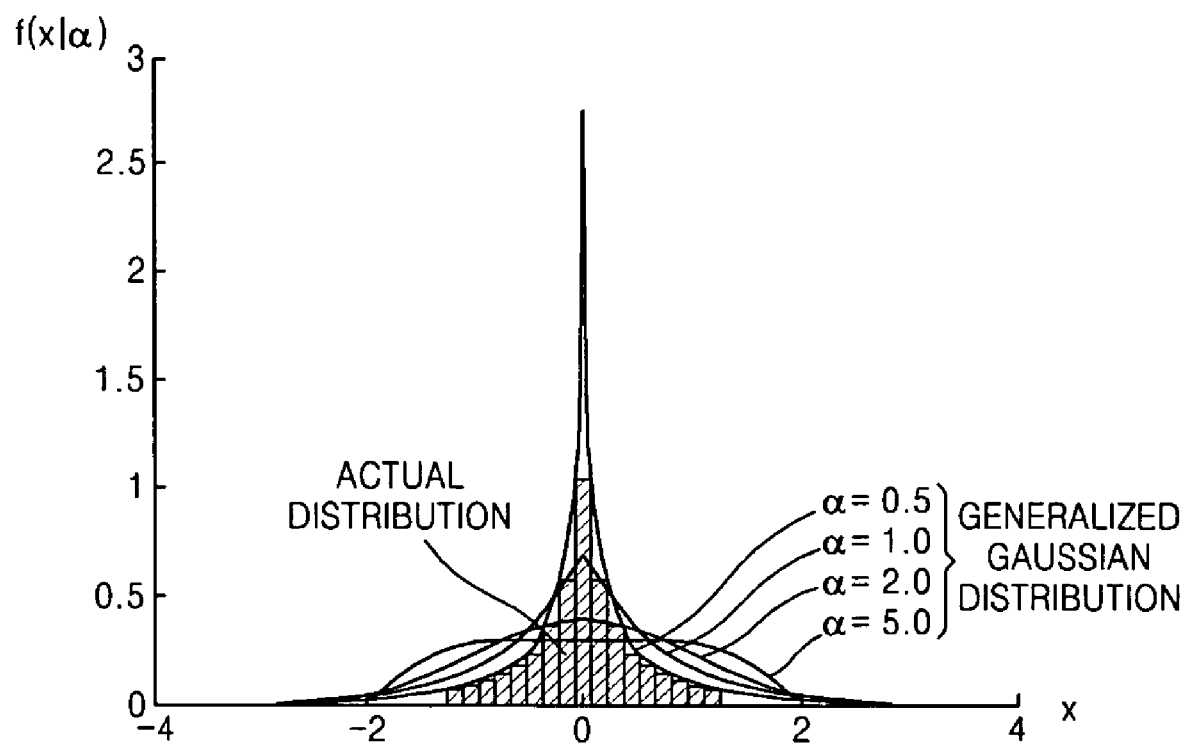
FIG. 3 is a graph illustrating an example of an actual distribution of an input signal and a generalized Gaussian distribution similar to an actual distribution.

FIG. 3 is a graph illustrating an example of an actual distribution of an input signal x and a generalized Gaussian distribution similar to the actual distribution. Referring to the graph of FIG. 3, the actual distribution of an input signal x is expressed as a number of occurrences of samples transformed into a frequency domain. In operation 10 of FIG. 2, the generalized Gaussian distribution variable α is determined by a search of generalized Gaussian distributions similar to the actual distribution. In FIG. 3, when the generalized Gaussian distribution variable α is 0.5, the generalized Gaussian distribution becomes similar to the actual distribution.

A chi-square scale is used to determine the generalized Gaussian distribution variable α at which the generalized Gaussian distribution becomes similar to the actual distribution of the input signal. The chi-square scale $X_q^2(\alpha)$ is expressed as follows below in Formula 2.

$$\chi_q^2(\alpha) = \sum_{i=1}^{l} \frac{(m_i - np_i)^2}{np_i}, \; p = p(x|\alpha) = -\int f(x|\alpha)dx \quad \text{Formula 2}$$

Here, q denotes a degree of freedom of the chi-square scale, I denotes the number of samples transformed into a frequency domain, m denotes an amplitude of the number of occurrences of a sample i of the actual distribution, n denotes a total sum of amplitudes of a number of occurrences of all samples, and $p_i$ denotes a probability p of the sample i of the generalized Gaussian distribution $f(x|\alpha)$.

Formula 3 can be obtained from Formula 2, and is expressed as follows below.

$$\alpha = \arg\left(\min_\alpha \chi_q^2(\alpha)\right) \quad \text{Formula 3}$$

Referring to Formula 3, a generalized Gaussian distribution variable α, which allows the chi-square scale $X_q^2(\alpha)$ to be a minimum value $$\min_\alpha X_q^2(\alpha),$$

is determined as a generalized Gaussian distribution variable similar to the input signal x.

Referring again to operation 10 in FIG. 2, a standard deviation of the input signal is determined with respect to the actual distribution. The determined standard deviation of the input signal is used when a scale factor (to be described below) is determined.

After operation 10, a correlation between a number of assigned bits to encode the input signal and a distortion rate of the input signal is determined (operation 12) by using the determined generalized Gaussian distribution variable α. Correlation information respectively corresponding to the generalized Gaussian distribution variables α is pre-stored. The correlation information includes information related to a graph of the number of assigned bits with respect to the distortion rate.

FIGS. 4A to 4D are graphs illustrating correlations between the number of assigned bits and the distortion rate according to different scaling factors corresponding to the generalized Gaussian distribution variables α. Four curved lines are included in each of the graphs of FIGS. 4A to 4D. These four curved lines respectively indicate correlations between the number of assigned bits and the distortion rate according to quantization scale types $S_1$, $S_2$, and $S_3$ to be described below with reference to FIG. 5.

Information (e.g., quantization scale factor graphs) indicating the correlation between the number of assigned bits and the distortion rate as shown in FIGS. 4A to 4D is respectively stored for each of the generalized Gaussian distribution variables a. Although FIGS. 4A to 4D respectively illustrate the cases where the generalized Gaussian distribution variables α are 0.25, 0.5, 1.00, and 2.00, they are only exemplary cases, and thus the stored correlation information may be associated with a large number of generalized Gaussian distribution variables α.

Figure 4A:
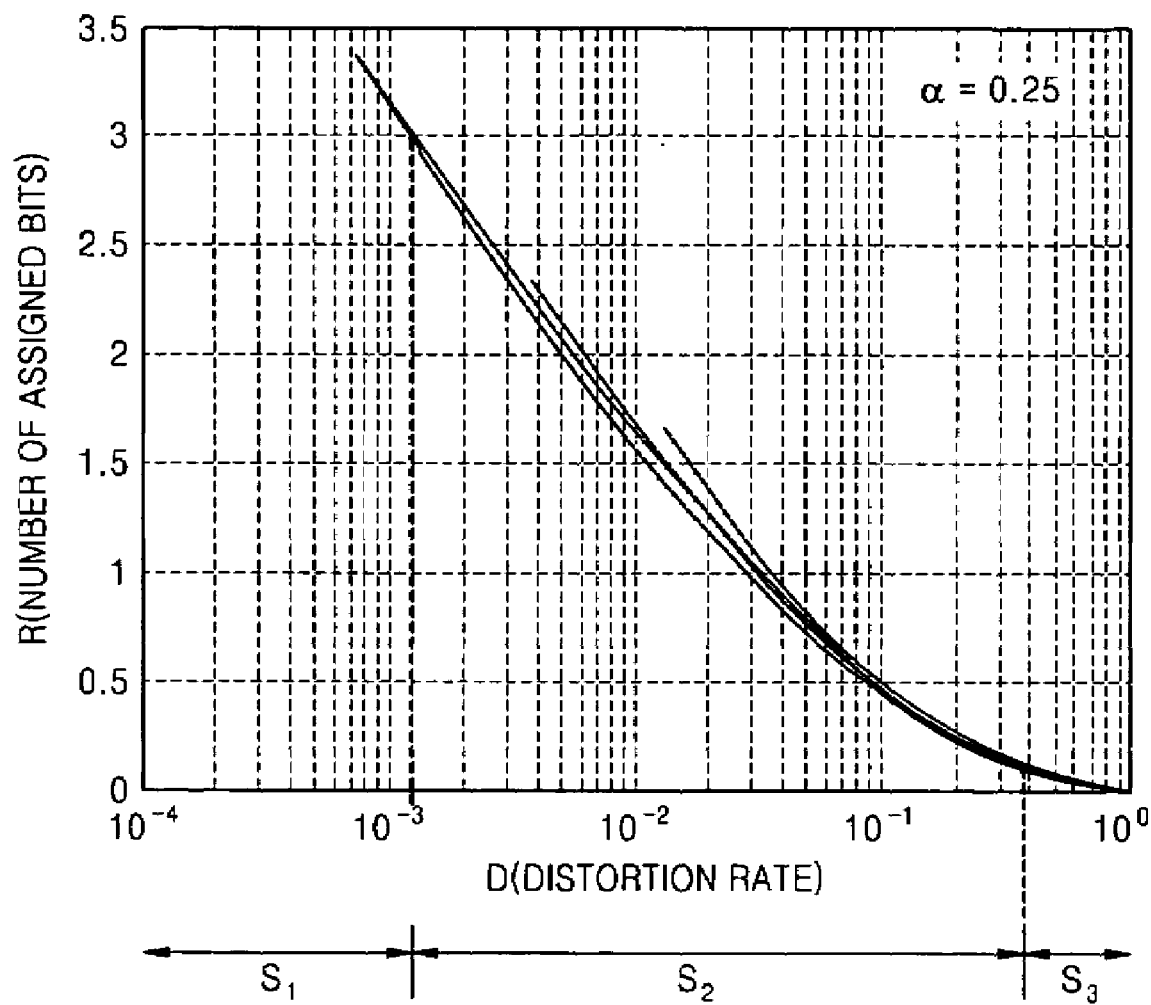
FIGS. 4A to 4D are graphs illustrating correlation between a number of assigned bits and a distortion rate according to generalized Gaussian distribution variables.
Figure 4B:
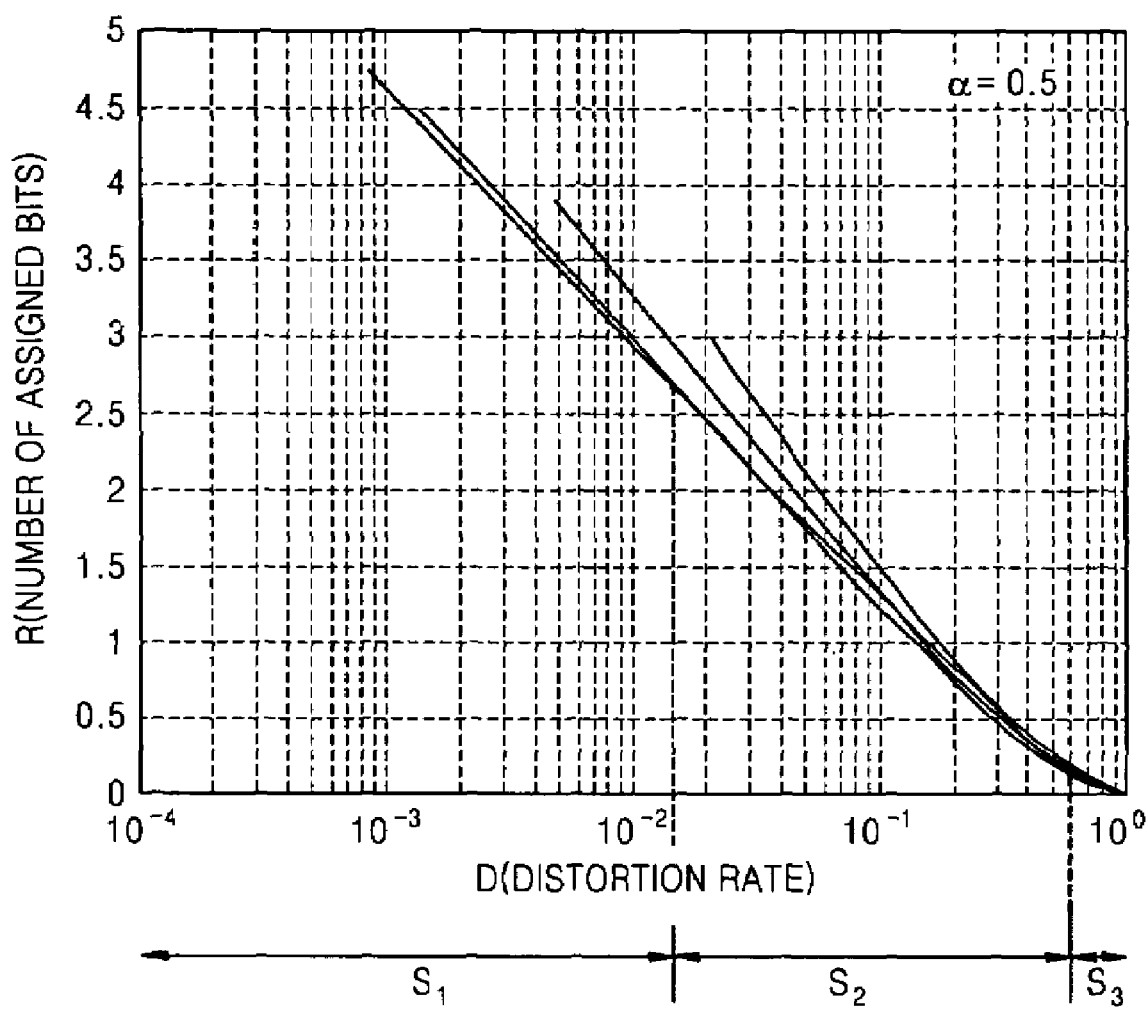

For example, if the generalized Gaussian distribution variable α corresponding to the input signal determined in operation 10 is 0.25, the correlation information of FIG. 4A corresponding to α=0.25 is determined from the correlation information pre-stored in operation 12.

After operation 12, a quantization scale type corresponding to the distortion rate of the input signal and a scale factor for quantization are determined by using the determined correlation (operation 14). In this case, the determined quantization scale type has a minimum number of assigned bits with respect to the distortion rate of the input signal. The distortion rate of the input signal may be determined by using psychoacoustic modeling. Specifically, the distortion rate of the input signal is determined by performing the psychoacoustic modeling so that quantization noise falls below a minimum audible limit when a permissible distortion level of the input signal is assigned during an encoding process.

When the input signal is quantized, a quantization scale is used to determine a scale for quantization of the input signal. The quantization scale type is provided so as to apply the quantization scale in a different manner according to the determined distortion rate of the input signal. The quantization scale type is expressed as follows below in Formula 4.

$$S_i = \{T_1, T_2, T_3, T_4, \ldots\} \quad \text{Formula 4}$$

$$T_J = \begin{cases} 2^{i-1}, & j = 1 \\ 1 + T_{j-1} \end{cases}$$

Here, $S_i$ denotes a quantization scale type, and $T_j$ denotes a quantization scale.

Figure 5:
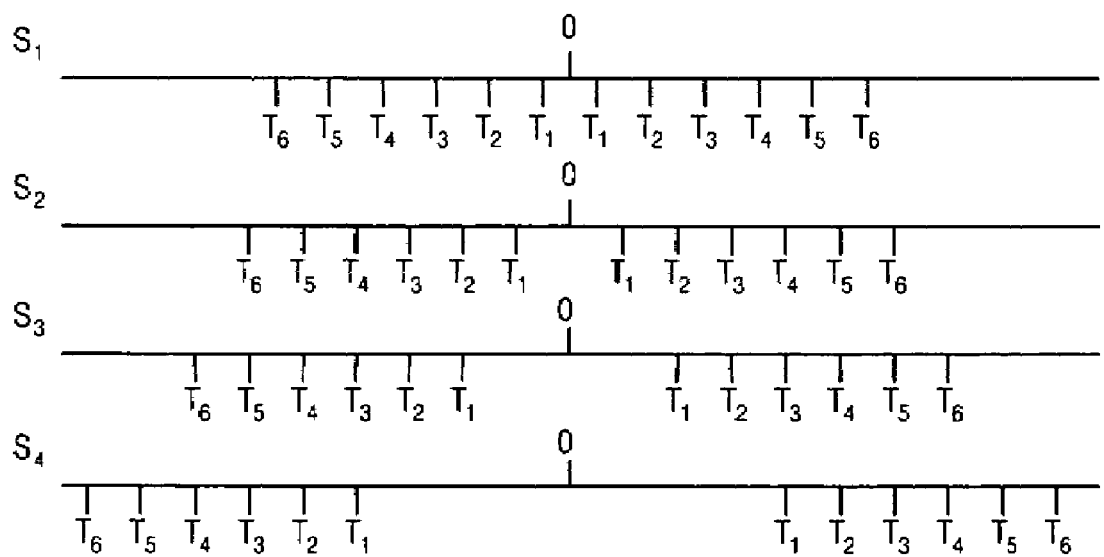
FIG. 5 illustrates an example of quantization scale types.
Figure 6A:
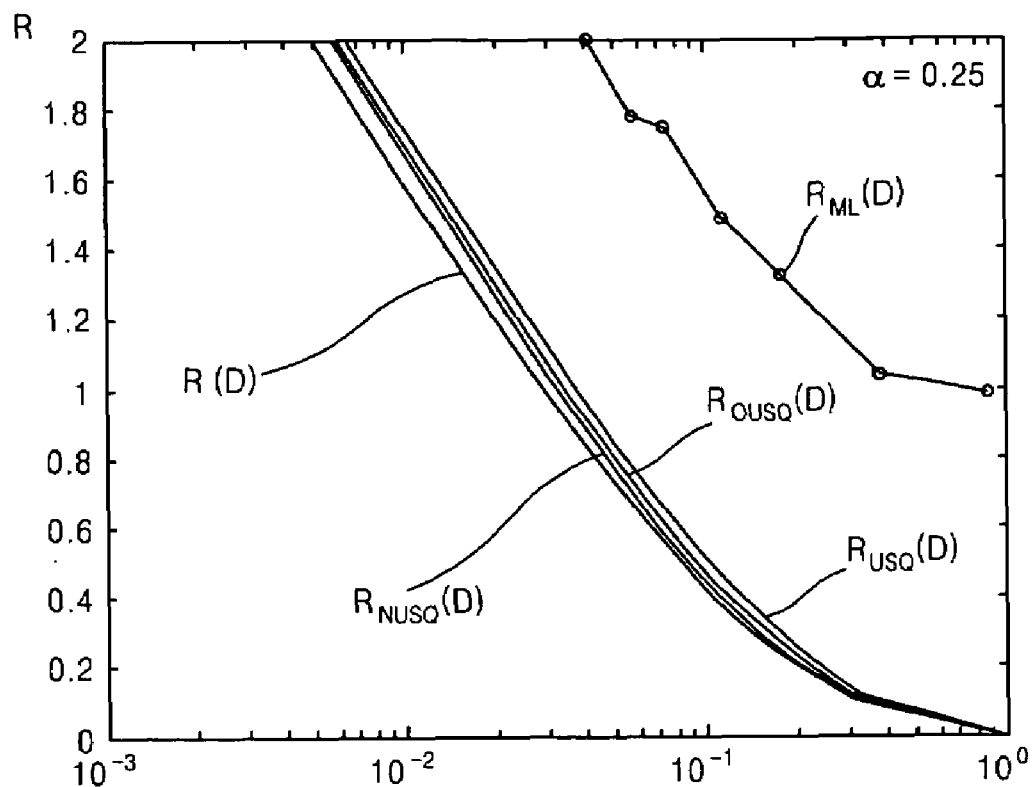
FIGS. 6A to 6D are graphs illustrating comparisons of a correlation between a number of assigned bits and a distortion rate according to a quantization method of the present general inventive concept as compared to a conventional quantization method.
Figure 6B:
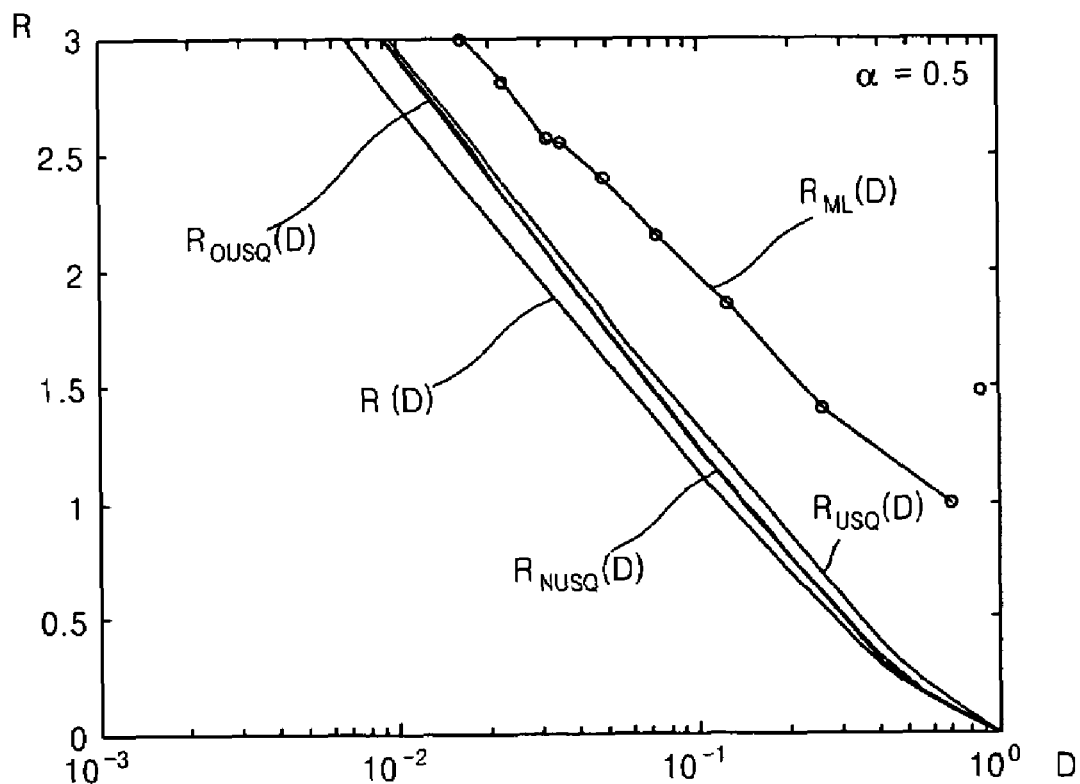
Figure 6C:
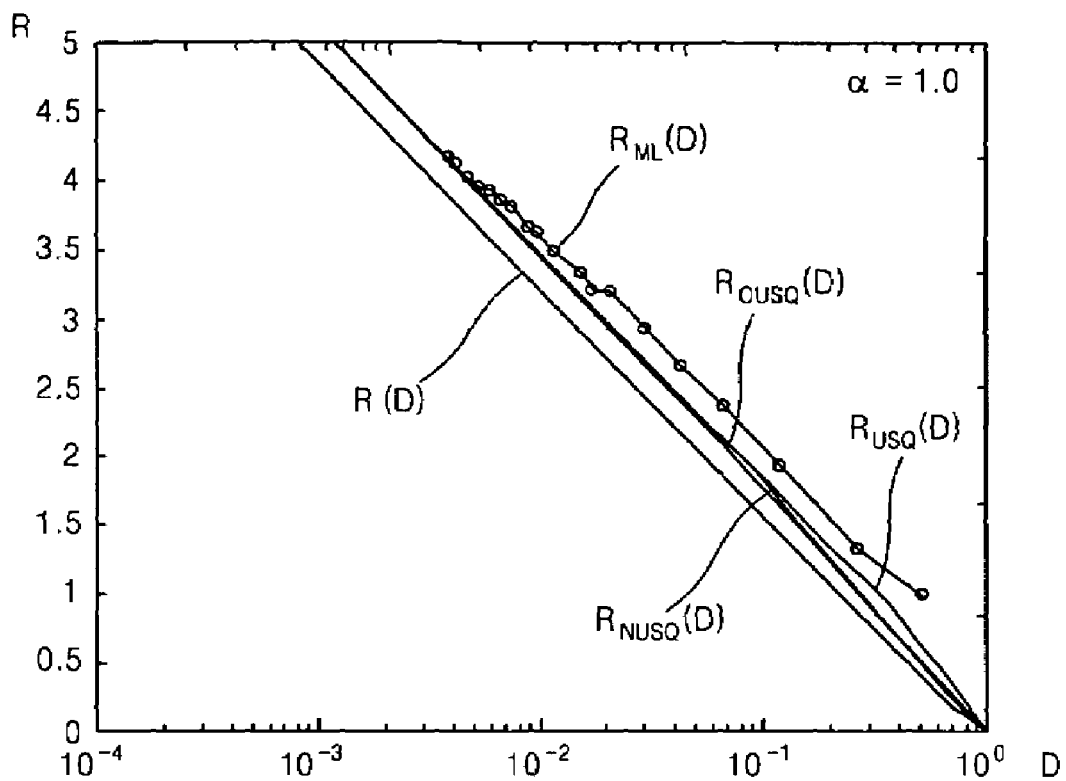
Figure 6D:
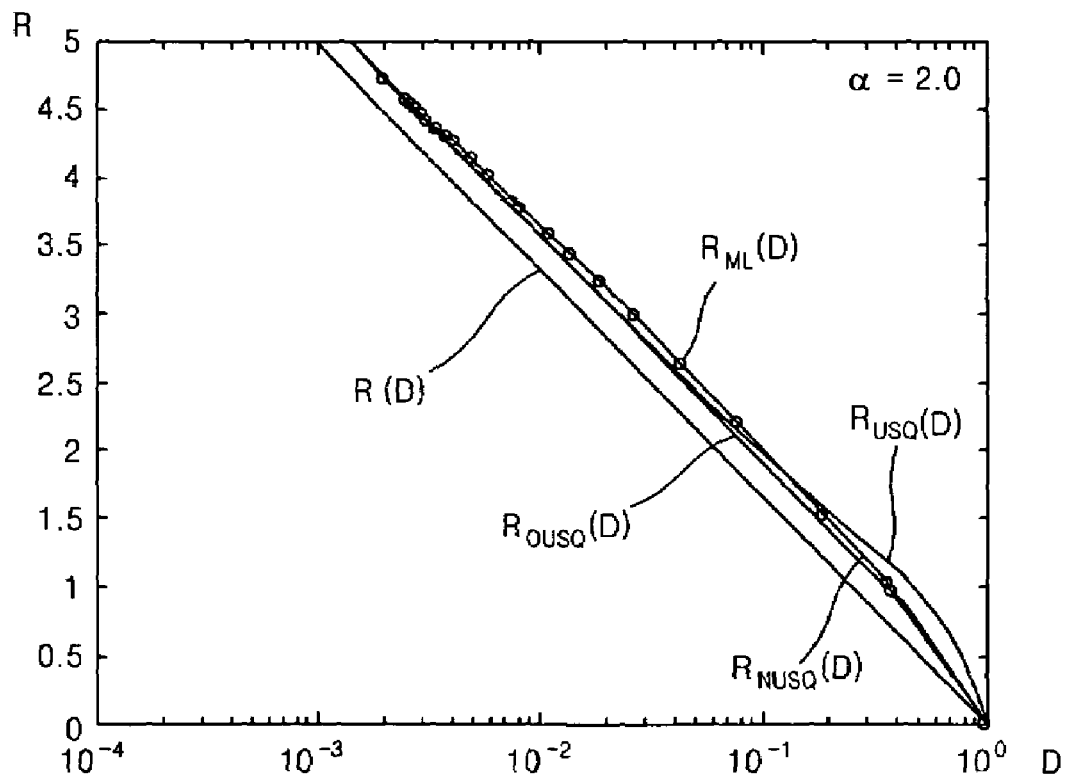

FIG. 5 illustrates an example of quantization scale types. Referring to FIG. 5, four quantization scale types are shown. In a quantization scale type $S_1$, since i=1, quantization scales of $T_1$=1, $T_2$=2, $T_3$=3, $T_4$=4, $T_5$=5, and $T_6$=6 are obtained by Formula 4. In a quantization scale type $S_2$, since i=2, quantization scales of $T_1$=2, $T_2$=3, $T_3$=4, $T_4$=5, $T_5$=6, and $T_6$=7 are obtained by Formula 4. In a quantization scale type $S_3$, since i=3, quantization scales of $T_1$=4, $T_2$=5, $T_3$=6, $T_4$=7, $T_5$=8, and $T_6$=9 are obtained by Formula 4. In a quantization scale type $S_4$, since i=4, quantization scales of $T_1$=8, $T_2$=9, $T_3$=10, $T_4$=11, $T_5$=12, and $T_6$=13 are obtained by Formula 4.

Figure 4C:
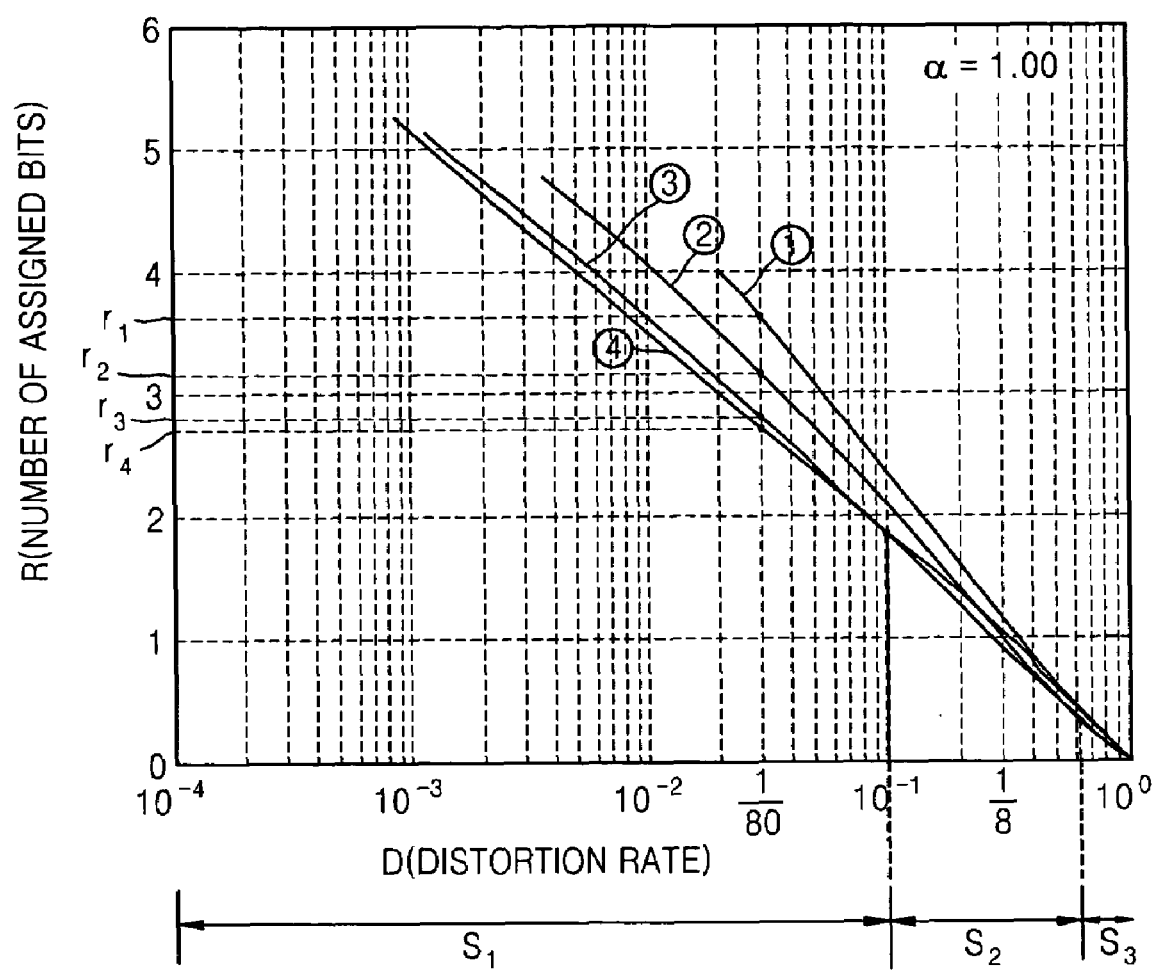
Figure 4D:
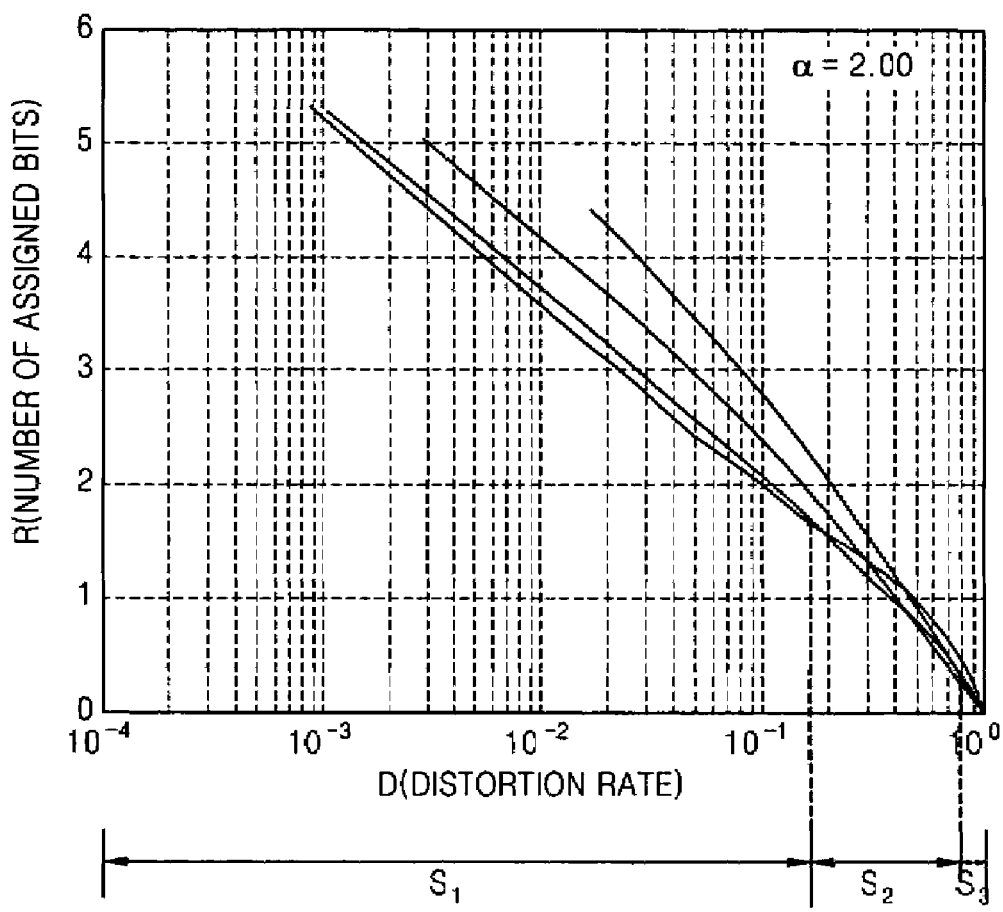

For example, if the correlation of FIG. 4C, which illustrates a case where the generalized Gaussian distribution variable α is 1.00, is determined in operation 12, and the distortion rate D of the input signal is determined to be D=1/80 by using the psychoacoustic model, then a quantization scale factor graph ④ having the minimum number of assigned bits with respect to the distortion rate of the input signal is determined from the determined correlation of FIG. 4C. When the distortion rate D is D=1/80, the number of assigned bits of a quantization scale factor graph ① is $r_1$, the number of assigned bits of a quantization scale factor graph ② is $r_2$, the number of assigned bits of a quantization scale factor graph ③ is $r_3$, and the number of assigned bits of the quantization scale factor graph ④ is $r_4$. Since better compression efficiency is obtained by determining a quantization scale type having a minimum number of assigned bits, when the distortion rate is D=1/80, the quantization scale factor graph ④ is determined as the quantization scale type for the distortion rate of D=1/80.

Further, by way of example, if the correlation of FIG. 4C, which illustrates a case where the generalized Gaussian distribution variable α is 1.00, is determined in operation 12, and the distortion rate D of the input signal is determined to be D=1/8 by using the psychoacoustic model, then a quantization scale factor graph ③ having the minimum number of assigned bits with respect to the distortion rate of the input signal is determined from the determined correlation of FIG. 4C. Again, since better compression efficiency is obtained by determining a quantization scale type having a minimum number of assigned bits, in the case where the distortion rate is D=1/8, the quantization scale factor graph ③ is determined.

As described above, a quantization scale type depending on a distortion rate of an input signal is obtained by using Formula 5 which is expressed as follows below.

$$i = \underset{i}{\operatorname{argmin}}(\min(|d_l^i - D|, |d_h^i - D|)) \quad \text{Formula 5}$$

Here, i denotes a quantization scale type, D denotes a distortion rate of an input signal, $d_l^i$ denotes a minimum distortion rate corresponding to a quantization scale type i, and $d_h^i$ denotes a maximum distortion rate corresponding to a quantization scale type i. When the distortion rate of the input signal is between the minimum distortion rate corresponding to the quantization scale type i and the maximum distortion rate corresponding to the quantization scale type i, the quantization scale type i is determined as a quantization scale type for the distortion rate of the input signal.

The scale factor corresponding to the distortion rate of the input signal is obtained by using Formula 6 which is expressed as follows below.

$$SF = \frac{\sigma}{\lambda(D)}, \lambda(D) = \lambda_l^i \times \exp\left(\frac{\ln(D/d_l^i)\ln(\lambda_h^i/\lambda_l^i)}{\ln(d_h^i/d_l^i)}\right) \quad \text{Formula 6}$$

Here, SF denotes a scale factor, σ denotes a standard deviation of an input signal, and D denotes a distortion rate of an input signal.

Since the scale factor is determined according to the distortion rate of the input signal, compression efficiency of quantization can be improved.

Referring to FIGS. 1 and 2, after operation 1, the input signal is quantized (operation 2) according to the determined quantization scale type and the determined scale factor (operation 14). A normalization coefficient is calculated according to the determined quantization scale type, and the input signal is quantized by using the calculated normalization coefficient and the scale factor.

The normalization coefficient is used to regulate a reference value used for quantization. The normalization coefficient is expressed as follows below in Formula 7 by using the aforementioned scale factor.

$$COEF = (2^{i-2} - 0.5) * SF \quad \text{Formula 7}$$

Here, COEF denotes a normalization coefficient, i denotes the quantization scale type, and SF denotes a scale factor.

The calculated normalization coefficient is used as expressed below in Formula 8 to quantize the input signal.

$$q = \begin{cases} 0, & |x| < COEF \\ \operatorname{sign}(x) \times \operatorname{round}\left(\frac{|x| - COEF}{SF}\right), & \text{otherwise} \end{cases} \quad \text{Formula 8}$$

Here, q denotes an index value corresponding to a quantization scale, x denotes an input signal, sign(x) denotes a positive or negative sign, and round denotes an operator used for integer processing of a calculated value.

An index value corresponding to a quantization scale is expressed as a subscript of the quantization scale $T_1$, $T_2$, $T_3$, $T_4$, $T_5$, or $T_6$ of FIG. 5. When the input signal is quantized by using Formula 8, the quantization scale is determined by a quantization scale index value q. For example, if the quantization scale type $S_2$ is determined, the quantization scale index value q having the quantization scale is determined to be q=3 by using the scale factor SF and the normalization coefficient COEF, and the input signal is quantized to be $T_3$=4, which corresponds to a scale $T_3$ of the quantization scale type $S_2$ of FIG. 5.

FIGS. 6A to 6D are graphs illustrating comparisons of a correlation between the number of assigned bits and a distortion rate according to a quantization method of the present general inventive concept as compared to conventional quantization methods. Referring to FIGS. 6A to 6D, $R_{NUSQ}(D)$ shows the correlation between the number of assigned bits and the distortion rate according to the quantization method of the present general inventive concept, R(D) shows the correlation between the number of assigned bits and the distortion rate according to an ideal quantization method, and $R_{USQ}(D)$, $R_{OUSQ}(D)$, and $R_{ML}(D)$ show the correlation between the number of assigned bits and the distortion according to the conventional quantization method. $R_{USQ}(D)$ and $R_{OUSQ}(D)$ denote uniform scalar quantization methods, and $R_{ML}(D)$ denotes a non-uniform scalar quantization method (for example, Max-Lloyd). As illustrated in FIGS. 6A to 6D, except for the ideal quantization method, the number of assigned bits is relatively small with respect to the distortion rate in the quantization method of the present general inventive concept. In addition, signal distortion is decreased when the number of assigned bits is small, in comparison with the conventional quantization method.

Now, a method of encoding an input signal according to an embodiment of the present general inventive concept will be described in detail with reference to the accompanying drawings.

Figure 7:
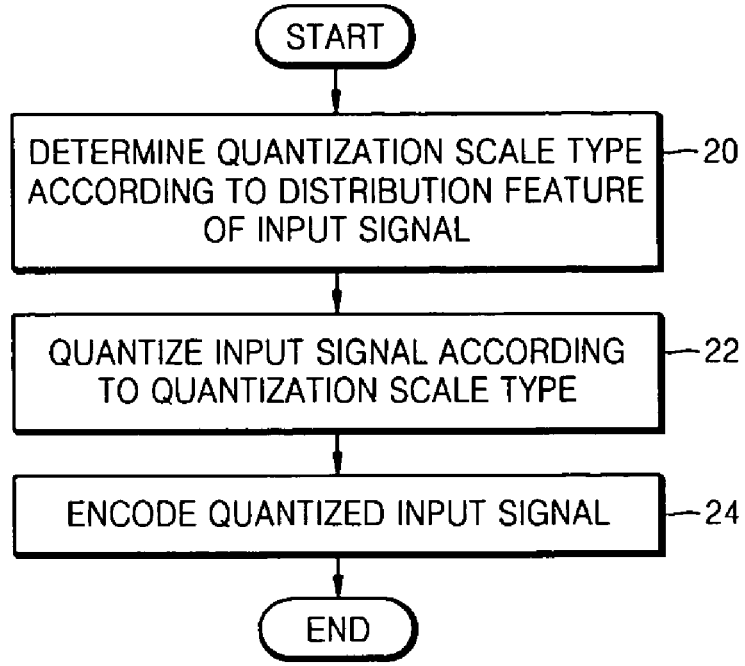
FIG. 7 is a flowchart illustrating a method of encoding an input signal according to an embodiment of the present general inventive concept.

FIG. 7 is a flowchart illustrating a method of encoding an input signal according to an embodiment of the present general inventive concept.

A quantization scale type is determined (operation 20) according to a distribution feature of an input signal.

Figure 8:
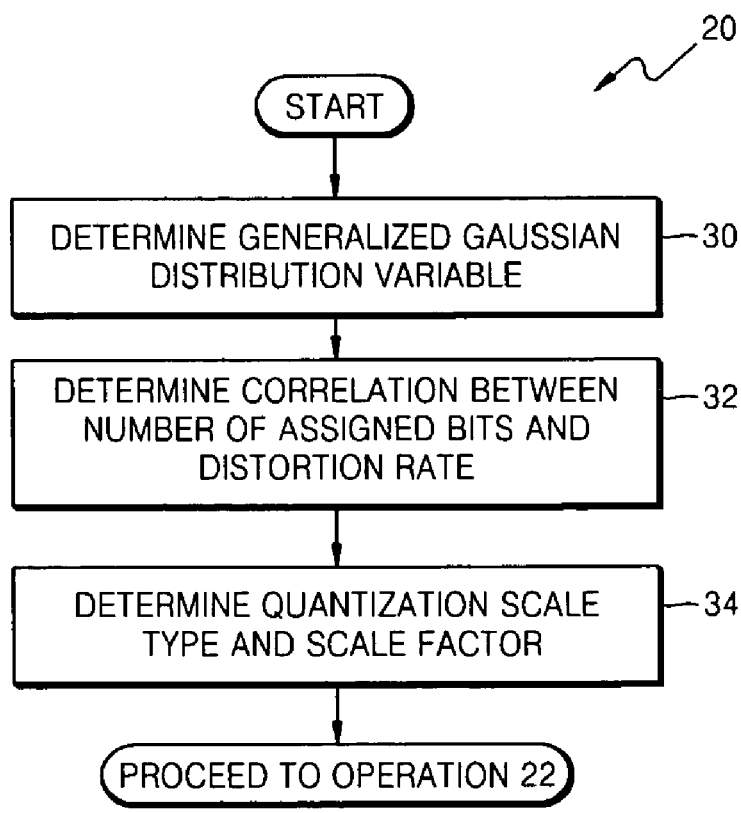
FIG. 8 is a flowchart illustrating an operation of determining a quantization scale type in the method of FIG. 7.

FIG. 8 is a flowchart illustrating the operation 20 of the method of FIG. 7.

Referring to FIGS. 7 and 8, a generalized Gaussian distribution variable, at which a generalized Gaussian distribution matches an input signal distribution, is determined (operation 30). Since operation 30 is the same as operation 10, a detailed description thereof will be omitted.

After operation 30, correlation between the number of assigned bits for encoding the input signal and a distortion rate of the input signal is determined (operation 32) by using the determined generalized Gaussian distribution variable. Since operation 32 is the same as operation 12, a detailed description thereof will be omitted.

After operation 32, a quantization scale type corresponding to the distortion rate of the input signal and a scale factor for quantization are determined by using the determined correlation (operation 34). Since operation 34 is the same as operation 14, a detailed description thereof will be omitted.

Referring back to FIG. 7, after operation 20, the input signal is quantized (operation 22) according to the determined quantization scale type and the determined scale factor. Since operation 22 is the same as operation 2, a detailed description thereof will be omitted.

After operation 22, the quantized input signal is encoded (operation 24). The quantized input signal is encoded into a binary bit stream. In this case, an entropy coding method is used to effectively encode the input signal without information loss.

Now, a method of dequantizing an input signal according to an embodiment of the present general inventive concept will be described in detail with reference to the accompanying drawings.

Figure 9:
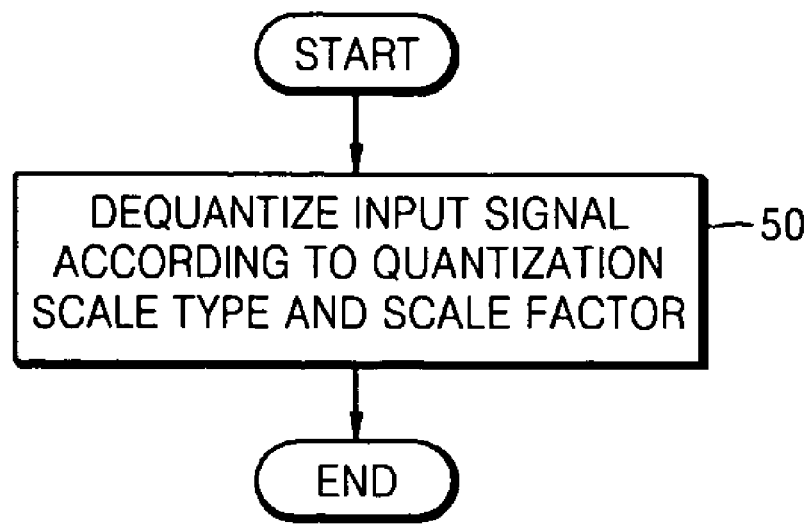
FIG. 9 is a flowchart illustrating a method of dequantizing an input signal according to an embodiment of the present general inventive concept.

FIG. 9 is a flowchart illustrating a method of dequantizing an input signal according to an embodiment of the present general inventive concept.

An input signal is dequantized (operation 50) according to a quantization scale corresponding to a distortion rate of an input signal and a scale factor for quantization. A decoded input signal is dequantized by using quantization scale types having different quantization intervals of quantization scales with respect to a reference point of 0. The quantization scale type is determined by using a correlation between the number of assigned bits to encode the input signal and a distortion rate of the input signal. Among the correlation graphs of FIGS. 4A to 4D, the quantization scale type is determined by using a correlation graph corresponding to a generalized Gaussian distribution variable. The quantization scale type has a minimum number of assigned bits with respect to the distortion rate of the input signal. The quantization scale type is determined during the process of encoding, and information on the determined quantization scale type is used as information for dequantization in the process of decoding. The scale factor is determined by using a standard deviation of the input signal. The scale factor is also determined during an encoding process, and information on the determined scale factor is used as information for dequantization in a decoding process. Since the quantization scale type and the scale factor are described above, descriptions thereof will be omitted. However, such information determined during the process of encoding is used in the process of dequantization.

Now, a method of decoding an input signal according to an embodiment of the present general inventive concept will be described in detail with reference to the accompanying drawings.

Figure 10:
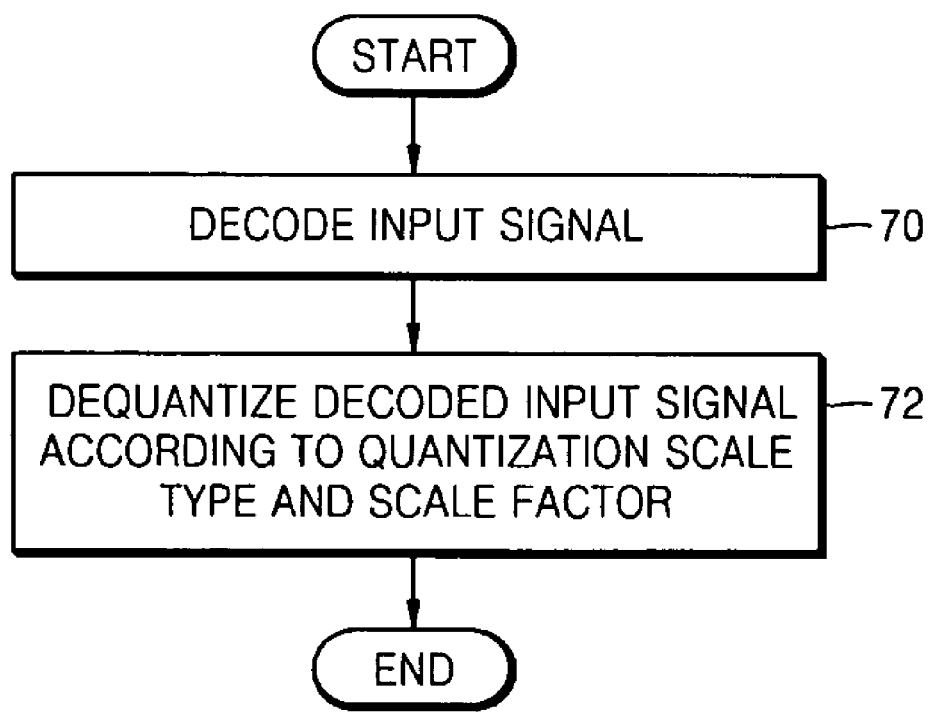
FIG. 10 is a flowchart of a method of decoding an input signal according to an embodiment of the present general inventive concept.

FIG. 10 is a flowchart illustrating a method of decoding an input signal according to an embodiment of the present general inventive concept.

The input signal is decoded (operation 70). When the encoded signal is input, a bit stream of the input signal is decoded. In this case, information on the input signal to be decoded includes information on a quantization scale type used in the process of encoding and a scale factor for quantization. Information on the quantization scale type and the scale factor is used as information used in dequantization to be described below.

After operation 70, the decoded input signal is dequantized (operation 72) according to the quantization scale type corresponding to the distortion rate of the decoded input signal and the scale factor for quantization. Since operation 72 is the same as operation 50, a detailed description thereof will be omitted.

Now, an apparatus to quantize an input signal according to an embodiment of the present general inventive concept will be described in detail with reference to the accompanying drawings.

Figure 11:
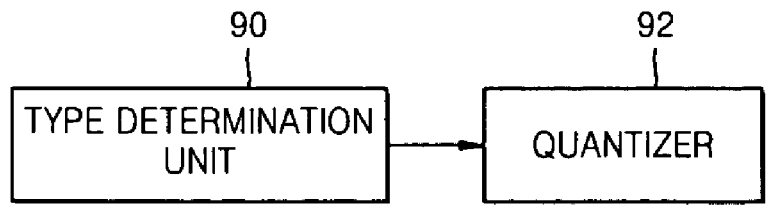
FIG. 11 is a block diagram illustrating an apparatus to quantize an input signal according to an embodiment of the present general inventive concept.

FIG. 11 is a block diagram illustrating an apparatus to quantize an input signal according to an embodiment of the present general inventive concept. The apparatus includes a type determination unit 90 and a quantizer 92.

Figure 12:
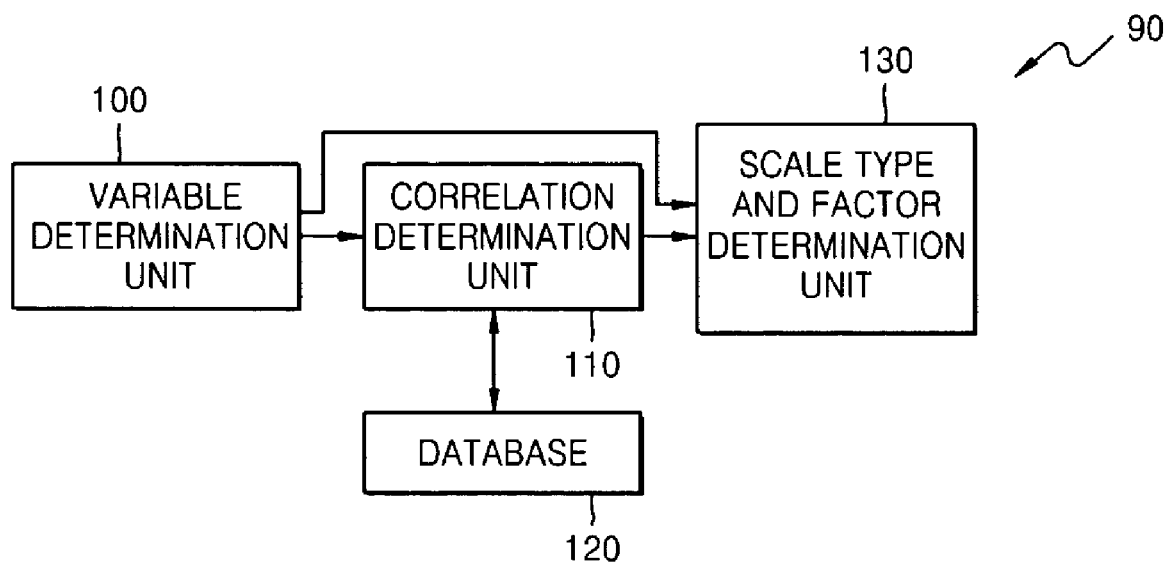
FIG. 12 is a block diagram illustrating a type determination unit of the apparatus of FIG. 11.

FIG. 12 is a block diagram illustrating a type determination unit 90 of the apparatus of FIG. 11. The type determination unit 90 includes a variable determination unit 100, a correlation determination unit 110, a database 120, and a scale type and factor determination unit 130.

Referring to FIGS. 11 and 12, the variable determination unit 100 determines a generalized Gaussian distribution variable, at which a generalized Gaussian distribution matches an input signal distribution, and outputs a determined result to the correlation determination unit 110. The variable determination unit 100 finds a generalized Gaussian distribution similar to an actual distribution of the input signal, and determines the generalized Gaussian distribution variable at which the generalized Gaussian distribution becomes similar to the actual distribution. In particular, in order to determine the generalized Gaussian distribution variable at which the generalized Gaussian distribution becomes similar to the actual distribution, the chi-square scale of Formula 2 is used. The variable determination unit 100 determines a variable, at which the chi-square scale becomes a minimum value among generalized Gaussian distribution variables, as the generalized Gaussian distribution variable similar to the input signal by using Formula 3 obtained from the chi-square scale of Formula 2. In addition to determining the generalized Gaussian distribution variable, the variable determination unit 100 determines a standard deviation of the input signal with respect to the actual distribution. The standard deviation of the determined input signal is output to the scale type and factor determination unit 130 in order to be used in a process of scale factor determination to be described below.

By using the determined generalized Gaussian distribution variable, the correlation determination unit 110 determines correlation between the number of assigned bits for encoding the input signal and the distortion rate of the input signal, and outputs the determined result to the scale type and factor determination unit 130. Correlation information respectively corresponding to the generalized Gaussian distribution variables are pre-stored in the database 120. The correlation information includes information related to a graph of the number of assigned bits with respect to the distortion rate. Referring to FIGS. 4A to 4D, the information on the correlation between the number of assigned bits and the distortion rate according to the generalized Gaussian distribution variables stored in the database 120 is shown. For example, if the determined generalized Gaussian distribution variable α corresponding to the input signal is 0.25, the correlation determination unit 110 determines correlation information corresponding to α=0.25 from the correlation information stored in the database 120.

The scale type and factor determination unit 130 determines a quantization scale type corresponding to the distortion rate of the input signal, and a scale factor, used for quantization, from the determined correlation, and outputs the determined result to the quantizer 92.

The scale type and factor determination unit 130 determines the quantization scale type having a minimum number of assigned bits with respect to the distortion rate of the input signal. The distortion rate of the input signal is determined by using psychoacoustic modeling. As shown in FIG. 5, the quantization scale type is provided in order to apply the quantization scale in a different manner according to the determined distortion rate of the input signal. For example, if the correlation of FIG. 4C, which illustrates the case where the generalized Gaussian distribution variable α is 1.00, is determined in operation 12, and the distortion rate D of the input signal is determined to be D=1/80 by using psychoacoustic modeling, then a quantization scale factor graph ④ having the minimum number of assigned bits with respect to the distortion rate of the input signal is determined from the determined correlation of FIG. 4C by the type determination unit 90. Since better compression efficiency is obtained by selecting a quantization scale type having a minimum number of assigned bits, when the distortion rate D is D=1/80, the quantization scale factor graph ④ is determined as a quantization scale type for the distortion rate of D=1/80. The scale type and factor determination unit 130 uses Formula 5 to determine a quantization scale type depending on a distortion rate of the input signal.

The scale type and factor determination unit 130 determines a scale factor by using the standard deviation of the input signal. The scale type and factor determination unit 130 uses Formula 6 to determine the scale factor corresponding to the distortion rate of the input signal. Since the scale factor is determined according to the distortion rate of the input signal, compression efficiency of quantization can be improved.

The quantizer 92 quantizes the input signal according to the determined quantization scale type and the determined scale factor. The quantizer 92 calculates a normalization coefficient according to the determined quantization scale type, and quantizes the input signal by using the calculated normalization coefficient and the scale factor. The normalization coefficient is used to regulate a reference value for quantization. The quantizer 92 determines a normalization coefficient by using Formula 7. Formula 7 uses a scale factor to obtain the normalization coefficient. The quantizer 92 quantizes the input signal by using Formula 8. In Formula 8, q denotes a quantization scale index value (i.e., an index value corresponding to a quantization scale). Thus, when the input signal is quantized by using Formula 8, a quantization scale is determined by the quantization scale index value q. For example, if the quantization scale type $S_2$ is determined, the quantization scale index value q is determined to be q=3 by using the scale factor SF and a normalization coefficient COEF, and the input signal is quantized to be $T_3$=4, which corresponds to a scale $T_3$ of the quantization scale type $S_2$ of FIG. 5.

Now, an apparatus to encode an input signal according to an embodiment of the present general inventive concept will be described in detail with reference to the accompanying drawings.

Figure 13:
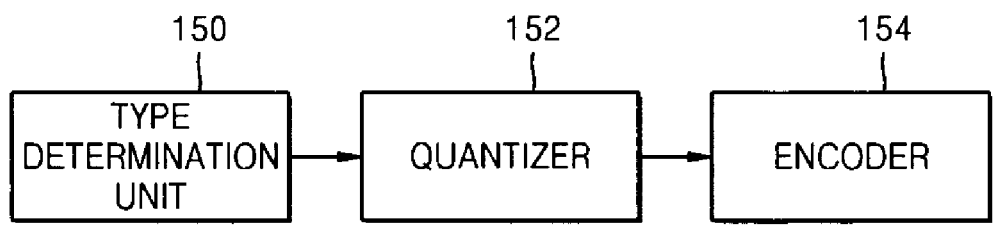
FIG. 13 is a block diagram illustrating an apparatus to encode an input signal according to an embodiment of the present general inventive concept.

FIG. 13 is a block diagram illustrating an apparatus to encode an input signal according to an embodiment of the present general inventive concept. The apparatus includes a type determination unit 150, a quantizer 152, and an encoder 154.

Figure 14:
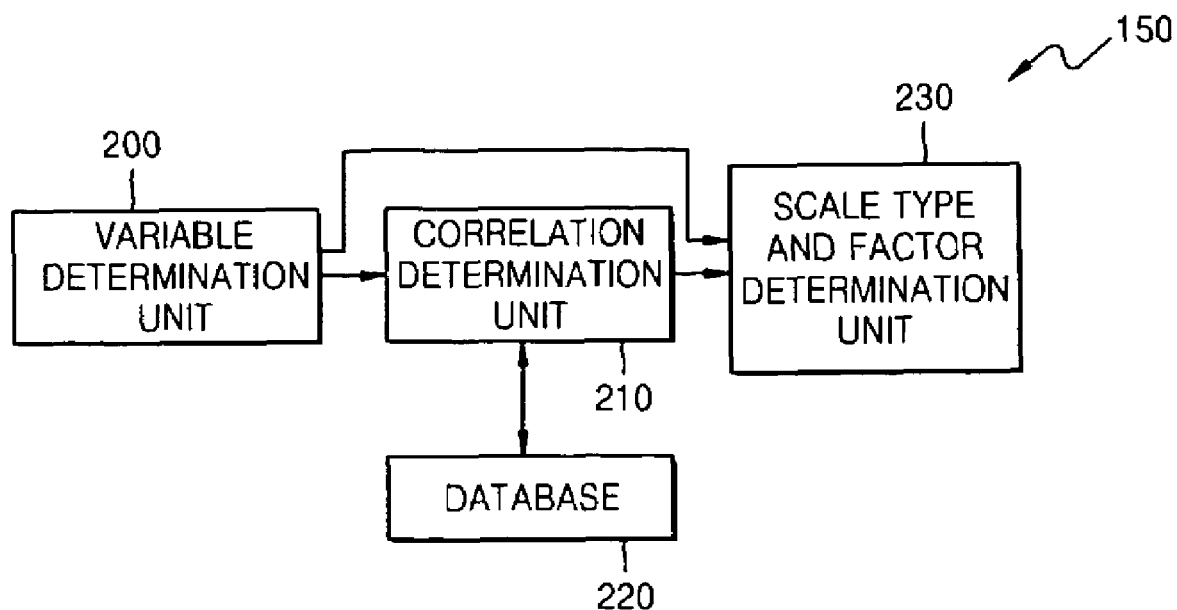
FIG. 14 is a block diagram illustrating a type determination unit of the apparatus of FIG. 13.

FIG. 14 is a block diagram illustrating the type determination unit 150 of the apparatus of FIG. 13. Referring to FIGS. 13 and 14, the type determining 150 includes a variable determination unit 200, a correlation determination unit 210, a database 220, and a scale type and factor determination unit 230.

The variable determination unit 200 determines a generalized Gaussian distribution variable, at which a generalized Gaussian distribution matches an input signal distribution. Since the variable determination unit 200 is the same as the aforementioned variable determination unit 100, a detailed description thereof will be omitted.

By using the determined generalized Gaussian distribution variable, the correlation determination unit 210 determines correlation between the number of assigned bits to encode the input signal and the distortion rate of the input signal. Since the correlation determination unit 210 is the same as the aforementioned correlation determination unit 110, a detailed description thereof will be omitted. Correlation information respectively corresponding to the generalized Gaussian distribution variables is pre-stored in the database 120.

The scale type and factor determination unit 230 determines a quantization scale type, corresponding to the distortion rate of the input signal, and a scale factor, used for quantization, from the determined correlation. The scale type and factor determination unit 230 determines a quantization scale type having a minimum number of assigned bits with respect to the distortion rate of the input signal. Furthermore, the scale type and factor determination unit 230 determines a scale factor by using a standard deviation of the input signal. Since the scale type and factor determination unit 230 is the same as the aforementioned scale type and factor determination unit 130, a detailed description thereof will be omitted.

According to the determined quantization scale type and the determined scale factor, the quantizer 152 quantizes the input signal. Since the quantizer 152 is the same as the aforementioned quantizer 92, a detailed description thereof will be omitted.

The encoder 154 encodes the input signal quantized by the quantizer 152. The encoder 154 encodes the quantized input signal into a binary bit stream. The encoder 154 may use an entropy coding method to effectively encode the input signal without information loss.

Now, an apparatus to dequantize an input signal according to an embodiment of the present general inventive concept will be described in detail with reference to the accompanying drawings.

Figure 15:
FIG. 15 is a block diagram illustrating an apparatus to dequantize an input signal according to an embodiment of the present general inventive concept.

FIG. 15 is a block diagram of an apparatus to dequantize an input signal according to an embodiment of the present general inventive concept. The apparatus includes a dequantizer 300.

According to a quantization scale corresponding to a distortion rate of an input signal and a scale factor for quantization, the dequantizer 300 dequantizes an input signal. The dequantizer 300 dequantizes a decoded input signal by using quantization scale types having different quantization intervals of quantization scales with respect to a reference point of 0. The quantization scale type is determined by using the correlation between the number of assigned bits to encode the input signal and the distortion rate of the input signal. Among the correlation graphs of FIGS. 4A to 4D, the quantization scale type is determined by using a correlation graph corresponding to a generalized Gaussian distribution variable. The quantization scale type has a minimum number of assigned bits with respect to the distortion rate of the input signal. The scale factor is determined by using a standard deviation of the input signal. The quantization scale type and the scale factor are determined during the encoding process, and the dequantizer 300 dequantizes information on the quantization scale type and the scale factor determined during the encoding process.

Now, an apparatus for decoding an input signal according to an embodiment of the present general inventive concept will be described in detail with reference to the accompanying drawings.

Figure 16:
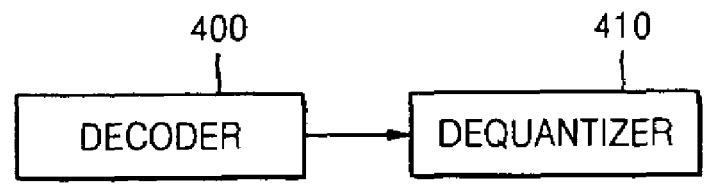
FIG. 16 is a block diagram illustrating an apparatus to decode an input signal according to an embodiment of the present general inventive concept.

FIG. 16 illustrates a block diagram illustrating an apparatus to decode an input signal according to an embodiment of the present general inventive concept. The apparatus includes a decoder 400 and a dequantizer 410.

The decoder 400 decodes the input signal and outputs the decoded result to the dequantizer 410. When the encoded signal is input, the decoder 400 decodes a bit stream of the input signal. In this case, the decoder 400 also decodes information on a quantization scale type used in the encoding process and a scale factor for quantization. Information on the quantization scale type and the scale factor is used as information for dequantization, to be described below.

The dequantizer 410 dequantizes the input signal decoded in the decoder 400, according to the quantization scale type corresponding to the distortion rate of the decoded input signal and the scale factor for quantization.

Now, a method of encoding an input signal according to another embodiment of the present general inventive concept will be described.

First, an audio signal containing pulse code modulation (PCM) data is input. After the data is input, the audio signal is frequency-transformed. Then, a quantization scale type is determined by analyzing a distribution feature of the frequency-transformed signal. Then, the frequency-transformed signal is quantized according to the determined scale type. Then, the quantized signal is lossless-encoded. Finally, a bit stream of the lossless-encoded signal is generated. Since the method of encoding the audio signal has already been described in the aforementioned method of encoding the input signal, a detailed description thereof will be omitted.

Now, a method of decoding an input signal according to another embodiment of the present general inventive concept will be described.

First, an encoded audio bit stream is input. Then, the input audio bit stream is lossless-decoded. Then, the decoded audio data is dequantized according to a quantization scale type corresponding to a distortion rate of the decoded audio data and according to a scale factor used for quantization. Finally, the dequantized audio data is inverse-transformed into a time domain. Since the method of decoding the audio signal has already been described in the aforementioned method of decoding the input signal, a detailed description thereof will be omitted.

An apparatus to encode an input signal according to another embodiment of the present general inventive concept includes a data input unit, a frequency transform unit, a scale type determination unit, a quantizer, an encoder, and a bit stream generator.

The data input unit receives an audio signal containing PCM data. The frequency transform unit frequency-transforms the audio signal. The frequency transform unit frequency-transforms the audio signal by using a modified discrete cosine transform/fast Fourier transform (MDCT/FFT). The scale type determination unit determines a quantization scale type by analyzing a distribution feature of the frequency-transformed signal. The quantizer quantizes the frequency-transformed signal according to the determined scale type. The encoder lossless-encodes the quantized signal. The bit stream generator generates a bit stream of the lossless-encoded signal. Since the apparatus to encode the audio signal has already been described in the aforementioned apparatus for encoding the input signal, a detailed description thereof will be omitted.

An apparatus to decode an input signal according to another embodiment of the present general inventive concept includes a data input unit, a decoder, a dequantizer, and an inverse-transform unit.

The data input unit receives an encoded audio bit stream. The decoder lossless-decodes the input audio bit stream. The dequantizer dequantizes decoded audio data according to a quantization scale type corresponding to a distortion rate of the decoded audio data and according to a scale factor for quantization. The inverse-transform unit inverse-transforms the dequantized audio data into a time domain. Since the apparatus to decode the audio signal has already been described in the aforementioned apparatus to decode the input signal, a detailed description thereof will be omitted.

Accordingly, a method and apparatus to quantize and dequantize an input signal, and a method and apparatus to encode and decode an input signal have an advantage in that signal distortion, which occurs when the number of assigned bits is small in the process of encoding and thus causes a problem in a uniform scalar quantization method, can be minimized.

In addition, compression efficiency of the input signal can be improved without an increase in complexity or having to use large sized additional information in order to determine an optimum scale.

In addition, the input signal can be encoded and decoded by considering a trade-off of a distortion rate corresponding to the number of assigned bits of the input signal.

The present general inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains. For example, the methods illustrated in FIGS. 1, 2, and 7-10 can be stored in the computer-recorded medium in a form of computer-readable codes to perform the methods when the computer reads the computer-readable codes of the recording medium Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of quantizing an input signal, the method comprising:
    determining a quantization scale type indicating a scale type for quantization according to a Gaussian distribution feature of an input signal; and
    quantizing the input signal according to the determined quantization scale type and the Gaussian distribution feature
    wherein the determining of the quantization scale type comprises:
    determining a generalized Gaussian distribution variable at which a generalized Gaussian distribution matches a distribution of the input signal;
    determining a correlation between the number of assigned bits used to encode the input signal and a distortion rate of the input signal by using the determined generalized Gaussian distribution variable; and
    determining the quantization scale type corresponding to the distortion rate of the input signal and determining a scale factor that is used for quantization from the determined correlation.

2. The method of claim 1, wherein the input signal is an audio signal.

3. The method of claim 1, wherein the determining of the generalized Gaussian distribution variable comprises determining a minimum value of chi-square scale as the generalized Gaussian distribution variable.

4. The method of claim 1, wherein the determining of correlation comprises pre-storing correlation information respectively corresponding to the generalized Gaussian distribution variable.

5. The method of claim 1, wherein the determining of the quantization scale type comprises determining the quantization scale type having a minimum number of assigned bits with respect to the distortion rate of the input signal.

6. The method of claim 1, wherein the quantization scale type is determined from quantization scales having different quantization intervals with respect to a reference point of 0.

7. The method of claim 6, wherein the quantization scale type is defined by using Formula 1:

$$S_i = \{T_1, T_2, T_3, T_4, \ldots\} \quad \text{Formula 1}$$
$$T_J = \begin{cases} 2^{i-1}, & j = 1 \\ 1 + T_{j-1} \end{cases}$$

where $S_i$ denotes a quantization scale type, and $T_j$ denotes a quantization scale.

8. The method of claim 1, wherein the distortion rate of the input signal is determined by using psychoacoustic modeling.

9. The method of claim 1, wherein the determining of a quantization scale comprises determining the scale factor by using a standard deviation of the input signal.

10. The method of claim 1, wherein the quantizing of the input signal comprises calculating a normalization coefficient according to the determined quantization scale type, and quantizing the input signal by using the calculated normalization coefficient and the scale factor.

11. A method of encoding an input signal, comprising:
   determining a quantization scale type indicating a scale type for quantization according to a Gaussian distribution feature of an input signal;
   quantizing the input signal according to the determined quantization scale type and the Gaussian distribution feature; and
   encoding the quantized input signal,
   wherein the determining of the quantization scale type comprises:
   determining a generalized Gaussian distribution variable at which a generalized Gaussian distribution matches a distribution of the input signal;
   determining correlation between a number of assigned bits used to encode the input signal and a distortion rate of the input signal by using the determined generalized Gaussian distribution variable; and
   determining a quantization scale type corresponding to the distortion rate of the input signal and determining a scale factor used for quantization from the determined correlation.

12. A computer-readable medium having embodied thereon a computer program to execute a method of quantizing an input signal, the method comprising:
   determining a quantization scale type indicating a scale type for quantization according to a distribution feature of an input signal; and
   quantizing the input signal according to the determined quantization scale type and the distribution feature,
   wherein the determining of the quantization scale type comprises:
   determining a generalized Gaussian distribution variable at which a generalized Gaussian distribution matches a distribution of the input signal;
   determining correlation between a number of assigned bits used to encode the input signal and a distortion rate of the input signal by using the determined generalized Gaussian distribution variable; and
   determining a quantization scale type corresponding to the distortion rate of the input signal and determining a scale factor used for quantization from the determined correlation.

13. A method of dequantizing an input signal, comprising:
   dequantizing an input signal according to a quantization scale type corresponding to a distortion rate determined by using a Gaussian distribution feature of the input signal and according to a scale factor used for quantization,
   wherein the quantization scale type is determined from quantization scales having different quantization intervals with respect to a reference point of 0, and the quantization scale type is defined by using Formula 1:

$$S_i = \{T_1, T_2, T_3, T_4, \ldots\} \quad \text{Formula 1}$$
$$T_J = \begin{cases} 2^{i-1}, & j = 1 \\ 1 + T_{j-1} \end{cases}$$

where $S_i$ denotes a quantization scale type, and $T_j$ denotes a quantization scale.

14. The method of claim 13, wherein the input signal is an audio signal.

15. The method of claim 13, wherein the scale factor is determined by using a standard deviation of the input signal.

16. The method of claim 13, wherein the quantization scale type is determined by using a correlation between a number of assigned bits for encoding the input signal and the distortion rate of the input signal.

17. The method of claim 13, wherein the quantization scale type has a minimum number of bits with respect to the distortion rate of the input signal.

18. A computer-readable medium having embodied thereon a computer program to execute a method of dequantizing an input signal, comprising:
   dequantizing the input signal according to a quantization scale type corresponding to a distortion rate of the input signal and according to a scale factor used for quantization,
   wherein the quantization scale type is determined from quantization scales having different quantization intervals with respect to a reference point of 0, and the quantization scale type is defined by using Formula 1:

$$S_i = \{T_1, T_2, T_3, T_4, \ldots\} \quad \text{Formula 1}$$
$$T_J = \begin{cases} 2^{i-1}, & j = 1 \\ 1 + T_{j-1} \end{cases}$$

where $S_i$ denotes a quantization scale type, and $T_j$ denotes a quantization scale.

19. A method of decoding an input signal, comprising:
   decoding an input signal; and dequantizing the decoded input signal according to a quantization scale type corresponding to a distortion rate of the decoded input signal and a cording to scale factor used for quantization.

20. The method of claim 19, wherein the quantization scale type is determined from quantization scales having different quantization interval with respect to a reference point of 0.

21. An apparatus to dequantize an input signal, comprising:
a dequantizer to dequantize an input signal according to a quantization scale type corresponding to a distortion rate determined by using a Gaussian distribution feature of the input signal and according to a scale factor used for quantization,
wherein the quantization scale type is determined from quantization scales having different quantization intervals with respect to a reference point of 0, and the quantization scale type is defined by using Formula 1:

$$S_i = \{T_1, T_2, T_3, T_4, ...\} \quad \text{Formula 1}$$
$$T_J = \begin{cases} 2^{i-1}, j = 1 \\ 1 + T_{j-1} \end{cases}$$

where $S_i$ denotes a quantization scale type, and $T_j$ denotes a quantization scale.

22. The apparatus of claim 21, wherein the quantization scale type is determined by using a correlation between the number of assigned bits to encode the input signal and a distortion rate of the input signal.

23. The apparatus of claim 21, wherein the quantization scale type has a minimum number of bits with respect to the distortion rate of the input signal.

24. The apparatus of claim 21, wherein the scale factor is determined by using a standard deviation of the input signal.

25. An apparatus to quantize an input signal, comprising:
a type determination unit to determine a quantization scale type indicating a scale type for quantization according to a Gaussian distribution feature of an input signal; and
a quantizer to quantize the input signal according to the determined quantization scale type and the Gaussian distribution feature,
wherein the type determination unit comprises:
a variable determination unit to determine a generalized Gaussian distribution variable at which a generalized Gaussian distribution matches a distribution of the input signal;
a correlation determination unit to determine a correlation between a number of assigned bits used to encode the input signal and a distortion rate of the input signal by using the determined generalized Gaussian distribution variable; and
a scale type and factor determination unit to determine a quantization scale type corresponding to the distortion rate of the input signal and to determine a scale factor used for quantization from the determined correlation.

26. The apparatus of claim 25, wherein the quantizer calculates a normalization coefficient according to the determined quantization scale type and quantizes the input signal by using the calculated normalization coefficient and the scale factor.

27. The apparatus of claim 25, wherein the type determination unit further comprises a database to store correlation information corresponding to the generalized Gaussian distribution variable.

28. The apparatus of claim 25, wherein the scale type and factor determination unit determines the quantization scale type having a minimum number of assigned bits with respect to the distortion rate of the input signal.

29. The apparatus of claim 25, wherein the quantization scale type is determined from quantization scales having different quantization intervals with respect to a reference point of 0.

30. The apparatus of claim 29, wherein the quantization scale type is defined by using Formula 1:

$$S_i = \{T_1, T_2, T_3, T_4, ...\} \quad \text{Formula 1}$$
$$T_J = \begin{cases} 2^{i-1}, j = 1 \\ 1 + T_{j-1} \end{cases}$$

where $S_i$ denotes a quantization scale type, and $T_j$ denotes a quantization scale.

31. The apparatus of claim 25, wherein the scale type and factor determination unit determines the scale factor by using a standard deviation of the input signal.

32. An apparatus to encode an input signal, comprising:
a type determination unit to determine a quantization scale type indicating a scale type for quantization according to a Gaussian distribution feature of an input signal;
a quantizer to quantize the input signal according to the determined quantization scale type and the Gaussian distribution feature; and
an encoder to encode the quantized input signal,
wherein the type determination unit comprises:
a variable determination unit to determine a generalized Gaussian distribution variable at which a generalized Gaussian distribution matches a distribution of the input signal;
a correlation determination unit to determine correlation between a number of assigned bits used to encode the input signal and a distortion rate of the input signal by using the determined generalized Gaussian distribution variable; and
a scale type and factor determination unit to determine a quantization scale type corresponding to the distortion rate of the input signal and to determine a scale factor used for quantization from the determined correlation.

33. An apparatus to decode an input signal, comprising:
a decoder to decode an input signal; and
a dequantizer to dequantize the decoded input signal according to a quantization scale type corresponding to a distortion rate of the decoded input signal and according to a scale factor used for quantization.

34. The apparatus of claim 33, wherein the quantization scale type comprises quantization scales having different quantization intervals with respect to a reference point of 0.

35. A method of encoding an audio signal, comprising:
receiving an audio signal including PCM (pulse code modulation) data;
frequency-transforming the audio signal;
determining a quantization scale type by analyzing a Gaussian distribution feature of the frequency-transformed audio signal;
quantizing the frequency-transformed audio signal according to the determined quantization scale type;
lossless-encoding the quantized signal; and
generating a bit stream of the lossless-encoded signal,
wherein the Gaussian distribution feature of the input signal comprises a generalized Gaussian distribution variable which represents a correlation between a number of assigned bits and a distortion rate of the input signal.

36. A method of processing an input signal, the method comprising:
determining a quantization scale type according to a distribution feature of the input signal, the distribution feature of the input signal comprising a generalized Gaussian distribution variable which represents a correlation between a number of assigned bits and a distortion rate of the input signal; and
processing the input signal according to the determined quantization scale type and the distribution feature.

37. The processing method of claim 36, wherein determining the quantization scale type further comprises:
determining the generalized Gaussian distribution variable to be a generalized Gaussian distribution variable at which a chi-square scale becomes a minimum value and at which the actual distribution of the input signal becomes similar to the generalized Gaussian distribution variable.

38. The processing method of claim 37, wherein the chi-square scale is expressed as:

$$\chi_q^2(\alpha) = \sum_{i=1}^{l} \frac{(m_i - np_i)^2}{np_i}, \; p = p(x|\alpha) = -\int f(x \mid \alpha) dx,$$

where I denotes a number of samples of the input signal transformed into a frequency domain, m denotes an amplitude of a number of occurrences of a sample i of the actual distribution of the input signal, x denotes the input signal, n denotes a total sum of amplitudes of a number of occurrences of all samples of the input signal, and $p_i$ denotes a probability of a sample i of a generalized Gaussian distribution $f(x|\alpha)$.

39. An apparatus to process an input signal, comprising:
a scale type determination unit to determine a quantization scale type according to a distribution feature of the input signal, the distribution feature of the input signal comprising a generalized Gaussian distribution variable which represents a correlation between a number of assigned bits and a distortion rate of the input signal; and
a processor to process the input signal according to the determined quantization scale type and the distribution feature.

40. The input signal processing apparatus of claim 39, wherein the scale type determination unit also determines a scale factor according to a distribution feature of the input signal which has a minimum number of assigned bits with respect to the distortion rate of the input signal.

41. An apparatus to encode and decode an input signal, comprising:
an encoder to encode an input signal according to a quantization scale type and a scale factor corresponding to a Gaussian distribution feature of the input signal, and to generate the encoded signal and information on the quantization scale type and the scale factor corresponding to the Gaussian distribution feature; and
a decoder to decode the encoded input signal to extract the quantization scale type and the scale factor, and to quantize the decoded signal according to the extracted quantization scale type and the scale factor,
wherein the Gaussian distribution feature of the input signal comprises a generalized Gaussian distribution variable which represents a correlation between a number of assigned bits and a distortion rate of the input signal.

42. An apparatus to decode an input signal, comprising:
a decoder to decode an input signal to extract a quantization scale type and a scale factor using a Gaussian distribution feature of the input signal, and to quantize the decoded signal according to the extracted quantization scale type and the scale factor,
wherein the Gaussian distribution feature of the input signal comprises a generalized Gaussian distribution variable which represents a correlation between a number of assigned bits and a distortion rate of the input signal.

43. A method of decoding an input signal, the method comprising:
decoding an input signal indicating according to a quantization scale type according to a Gaussian distribution feature of the input signal; and
a processor to process the input signal according to the determined quantization scale type and the Gaussian distribution feature,
wherein the Gaussian distribution feature of the input signal comprises a generalized Gaussian distribution variable which represents a correlation between a number of assigned bits and a distortion rate of the input signal.

44. An apparatus to encode an audio signal, comprising:
a data input unit to receive an audio signal including PCM (pulse code modulation data);
a frequency transforming unit to frequency-transform the audio signal;
a scale type determination unit to determine a quantization scale type by analyzing a Gaussian distribution feature of the frequency-transformed signal;
a quantizer to quantize the frequency-transformed audio signal according to the determined quantization scale type;
an encoder to lossless-encode the quantized signal; and
a bit stream generator to generate a bit stream of the lossless-encoded signal,
wherein the Gaussian distribution feature of the input signal comprises a generalized Gaussian distribution variable which represents a correlation between a number of assigned bits and a distortion rate of the input signal.

45. A method of decoding an audio signal, comprising:
receiving an encoded audio bit stream;
lossless-decoding the input audio bit stream;
dequantizing the decoded audio data according to a quantization scale type corresponding to a distortion rate of the input signal and a scale factor for quantization; and
inverse-transforming the dequantized audio data into audio data of a time domain.

46. An apparatus to decode an audio signal, comprising:
a data input unit to receive an encoded audio bit stream;
a decoder to lossless-decode the input audio bit stream;
a dequantizer to dequantize the decoded audio data according to a quantization scale type corresponding to a distortion rate of the input signal and according to a scale factor used for quantization; and
an inverse-transforming unit to inverse-transform the dequantized audio data into audio data of a time domain.

47. A method of encoding an input signal, the method comprising:
encoding an input signal according to a quantization scale type and scale factor corresponding to a Gaussian distribution feature of the input signal; and
generating encoded signal information on the quantization scale type and the scale factor corresponding to the Gaussian distribution feature, wherein the Gaussian distribution feature of the input signal comprises a generalized Gaussian distribution variable which represents a correlation between a numb of assigned bits and a distortion rate of the input signal.

48. An apparatus to encode an input signal, comprising:

an encoder to encode an input signal according to a quantization scale type and a scale factor corresponding to a Gaussian distribution feature of the input signal, and to generate encoded signal and information on the quantization scale type and the scale factor corresponding to the Gaussian distribution feature, wherein the Gaussian distribution feature of the input signal comprises a generalized Gaussian distribution variable which represents a correlation between a number of assigned bits and a distortion rate of the input signal.

* * * * *